US008820143B2

(12) United States Patent
Sarma et al.

(10) Patent No.: US 8,820,143 B2
(45) Date of Patent: Sep. 2, 2014

(54) LEAK DETECTION SYSTEM

(75) Inventors: Sanjay E. Sarma, Lexington, MA (US); Kamal Youcef-Toumi, Cambridge, MA (US); Stephen Sai-Wung Ho, Cambridge, MA (US); Dimitrios Chatzigeorgiou, Somerville, MA (US); Rached Ben Mansour, Dhahran (SA)

(73) Assignee: Massachusetts Institute of Technology, Cambridge, MA (US)

( * ) Notice: Subject to any disclaimer, the term of this patent is extended or adjusted under 35 U.S.C. 154(b) by 534 days.

(21) Appl. No.: 13/082,730

(22) Filed: Apr. 8, 2011

(65) Prior Publication Data

US 2012/0255343 A1    Oct. 11, 2012

(51) Int. Cl.
*G01M 3/28*    (2006.01)
(52) U.S. Cl.
CPC .......... *G01M 3/2815* (2013.01); *G01M 3/2807* (2013.01)
USPC ........................................ 73/40.5 R; 73/49.1
(58) Field of Classification Search
CPC .......................... G01M 3/2807; G01M 3/2815
USPC ........................... 73/40.5 R, 49.1, 49.5, 865.8
See application file for complete search history.

(56) References Cited

U.S. PATENT DOCUMENTS

| | | | |
|---|---|---|---|
| 3,722,261 A | 3/1973 | Milke | |
| 3,817,086 A | 6/1974 | Dorgebray | |
| 3,974,680 A * | 8/1976 | Beaver | 73/40.5 R |
| 4,020,674 A | 5/1977 | Fechter et al. | |
| 4,051,714 A * | 10/1977 | Fechter et al. | 73/40.5 A |
| 4,375,763 A | 3/1983 | Hogan | |
| 4,584,871 A | 4/1986 | Lohn | |
| 5,072,622 A | 12/1991 | Roach et al. | |
| 6,348,869 B1 * | 2/2002 | Ashworth | 340/605 |
| 7,856,864 B2 | 12/2010 | McEwan et al. | |

FOREIGN PATENT DOCUMENTS

JP       11-044605 A    2/1999

OTHER PUBLICATIONS

A. Vickers, "The Future of Water Conservation: Challenges Ahead," Water Resources Update, Universities Council on Water Resources, 114, 49-51, 1999.
Environment Canada, 2004. Threats to Water Availability in Canada. National Water Research Institute, Burlington, Ontario. NWRI Scientific Assessment Report Series No. 3 and ACSD Science Assessment Series No. 1. 128 p.
Anthony Bond, Brian Mergelas, and Cliff Jones. "Pinpointing Leaks in Water Transmission Mains," Pipelines 2004 146, 91 (2004).
http://www.imagesco.com/sensors/flex-sensor.html, (2010).
International Search report and Written Opinion issued in Connection with International Patent Application No. PCT/US2012/026921 mailed on Dec. 3, 2012.
International Preliminary Report on Patentability issued in Connection with International Parent Application PCT/US2012/026921.

* cited by examiner

*Primary Examiner* — Daniel S Larkin
(74) *Attorney, Agent, or Firm* — Sam Pasternack; MIT Technology Licensing Office

(57) ABSTRACT

The system includes structure for supporting at least one tube within a pipe. The tube has one end disposed close to, or in contact with, a wall of the pipe. A sensor is disposed within the at least one tube to detect a pressure gradient or fluid movement within the tube. Such pressure gradient or fluid movement indicates a leak in the pipe adjacent to the tube location. In a preferred embodiment, the structure is a ring sized to fit within the pipe and the ring supports a plurality of tubes. In another aspect, the tube includes a restriction to prevent flow and pressure is measured on each side of the restriction.

15 Claims, 3 Drawing Sheets

LEAK DETECTION SYSTEM

BACKGROUND OF THE INVENTION

This invention relates to leak detection and more particularly to a leak detection system for deployment within a pipe.

Access to clean, potable water is of critical importance to all communities across the globe. Water scarcity is projected to be a growing problem for developing regions and industrialized nations alike. Even well developed regions with ample water supplies may encounter water shortages in the future due to population growth, climate change, and aging infrastructure. Water supply and water supply distribution are critical to a community's well being, and their role in addressing future needs of the world's cities and population will only grow in upcoming years.

In addition to accessing and treating water supplies, effective and efficient transportation of water from the water utility to consumer is critical in the management and distribution of water to its needed destination. Inefficiencies due to losses such as leaks in the distribution system have multiple negative impacts including energy and effort wasted for accessing and treating the water as well as the water itself. As the demand for clean water rises, water less due to inefficiencies in the distribution system threaten the water supplier's ability to meet demand. As access to existing and new sources of freshwater diminish, addressing water losses during distribution could replace the need to access new sources. Further wore in cases where water supply meets demand despite distribution waste and inefficiency, the energy and cost of accessing and purifying water sources into clean drinking water represent significant monetary and energy waste.

Water losses in USA municipalities typically range from 15 to 25 percent[1]. Superscript numbers refer to the references included herewith. The contents of all of these references are incorporated herein by reference in their entirety. The Canadian Water Research institute reports that on average, 20 percent of treated water is wasted due to losses during distribution and other unaccounted means[2]. Some unaccounted water losses include metering errors, accounting errors and theft; however, typically the greatest contributor to lost water is caused by leaks in the distribution pipes[3]. Clean water losses due to leaks represent a significant portion of the water supply.

A wide variety of approaches exist for detecting water leaks in pipes. At the most simplistic and basic level, the difference between the amounts of water produced by the water utility and the total amount of water recorded by water usage meters indicates the amount of unaccounted water. Larger values of unaccounted water almost certainly indicate losses due to leaks. More sophisticated methods for measuring and localizing water leaks in distribution pipes include acoustic methods where listening devices identify water leaks via characteristic sounds that indicate the presence of a water leak. In Direct Listening methods a trained technician surveys an area by moving a listening device around on the surface above a buried water pipe. The listening device transmits sound to the technician, and the technician listens for sounds consistent with a leaking pipe. Correlation methods use two listening devices placed at different locations along a distribution pipe and compare the acoustic signals to not only identify the presence of a leak, but also calculate the location between the listening devices based on the time delay between the two devices. Acoustic methods have also been extended to devices that operate inside the pipe to detect water leaks including the Sahara system[4], which also detects leaks based on characteristics found in the acoustic signal.

While newer technologies have successfully moved acoustic methods to inside the pipe sensing, acoustic methods were born from the need to sense leaks from outside of the pipe. With new technologies to deliver sensor hardware to the interior of an active pipe network, non-acoustic methods can offer better sensing opportunities that were not available when out-of-pipe sensing was the predominant method for leak detection.

An object of the invention is thus an in-pipe leak detection system that includes structure capable of moving along the inside of a pipe and responsive to leaks in a wall of the pipe, or to leaks at pipe joints, pipe connections and valves.

SUMMARY OF THE INVENTION

The leak detection system according to one aspect of the invention includes structure for supporting at least one tube within a pipe. The tube has one end disposed close to, or in contact with, a wall of the pipe. The tube may be substantially perpendicular to the pipe axis. A sensor is disposed within the at least one tube to detect a pressure gradient within the tube. The pressure gradient indicates a leak in the pipe adjacent to the tube location. The pressure gradient may be measured by fluid flow in the tube. In a preferred embodiment, the structure is a ring sized to fit within the pipe. In this embodiment, the ring may be adapted to support a plurality of tubes. In yet another preferred embodiment, the system includes a plurality of rings, each ring supporting a plurality of tubes.

The sensor that detects a pressure gradient within the tube may be a contact sensor, a flux sensor, a turbine meter, a hot-wire anemometer, a variable area flow meter, a positive displacement sensor, or a strain gauge. In yet another embodiment, the sensor responds to the quantity of fluid flow within the tube so that the magnitude of a leak may be determined. The system may further include a display for showing a two-dimensional leak pattern in the pipe. The system may further include means for moving the structure supporting the tubes along the pipe.

In another embodiment, the tubes and embedded sensor have sensitivities that are sufficiently localized such that leak detection by any one tube indicates a leak at the tube's location while other tubes farther away from the leak may not indicate a leak. Multiple 'snapshots' along the length of the pipe form a picture of the leak based on the collection of data from many tubes over time.

In another aspect, the invention is a leak detection system that includes structure for supporting at least one tube within a pipe. The tube has one end disposed close to, or in contact with, a wall of the pipe. The tube includes a flow restriction that prevents flow through the tube. Means are provided for measuring pressure within the tube on both sides of the restriction. A difference in pressure on the two sides of the restriction indicate a leak in the pipe adjacent to the tube location. A preferred embodiment of this aspect of the invention uses a membrane within the tube to form the restriction.

DESCRIPTION OF THE PREFERRED EMBODIMENT

Figure 1A:
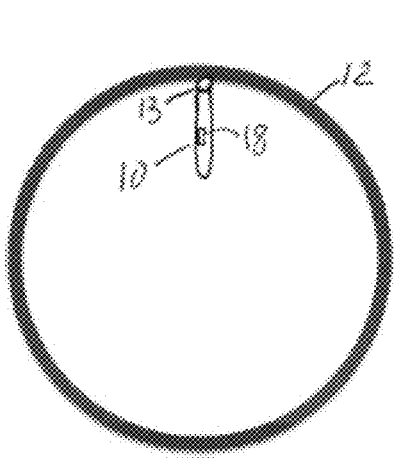
FIG. 1a is a schematic illustration of an embodiment of the invention showing a tube within a pipe that has no leak.
Figure 1B:
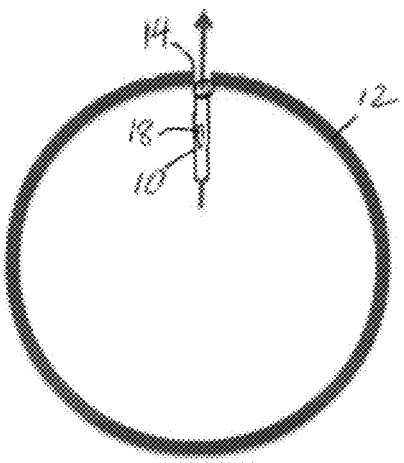
FIG. 1b is a schematic illustration of an embodiment of the invention showing a tube within a pipe having a leak.
Figure 2:
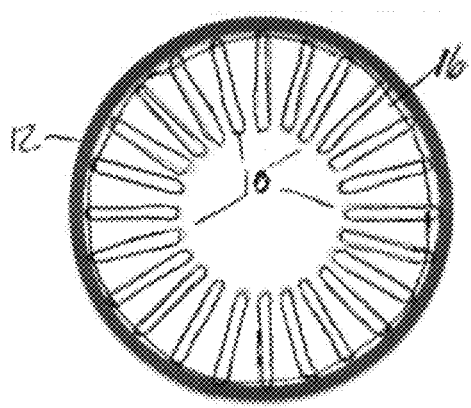
FIG. 2 is a schematic illustration of an embodiment of the invention showing multiple sensing tubes arranged in a ring.

With reference to FIG. 1, consider a single small tube 10 within a pipe 12. The hollow tube 10 is oriented perpendicular to the pipe 12 axis and one end 13 is against (or very close) to the pipe wall. If the small tube happens to be located at a pipe leak 14 (FIG. 1b), then water will flow through the tube 10 and out the pipe 12. If the small tube 10 is located at a point where the pipe is solid, no flow will occur (FIG. 1a).

By maneuvering the tube 10 over a leak, we can detect the leak. Furthermore, knowledge of the position and orientation of the tube 10 at the time of leak detection reveals the location of the leak as well. However, using a single tube 10 (and thus checking a single point of the pipe 12 at a time) will lead to difficulties in surveying the entire pipe 12 surface. By us many tubes 10 we can check multiple points in the pipe 12 simultaneously. Short, small tubes 10 could be arranged on a ring 16 to monitor many points around the pipe 12 circumference. A sufficiently high density of tubes 10 would sense a leak anywhere around the circumference.

As the ring 16 passes through the pipe 12, lack of flow through the small tubes 10 indicates solid pipe (no leak). Furthermore, each tube 10 functions independently. That is, a leak detected in one tube indicates the position on the pipe 12 where the leak is occurring. Some, not all, of the tubes may detect flow and therefore a leak. In essence the ring of tubes 'scans' the pipe wall for leaks.

Figure 3:
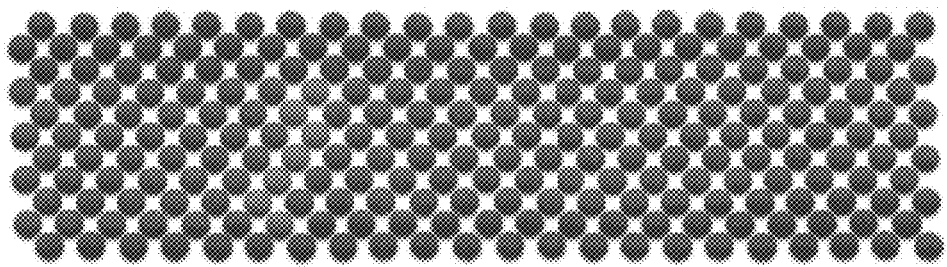
FIG. 3 is a schematic illustration of a pipe scan showing a crack leak.
Figure 4:
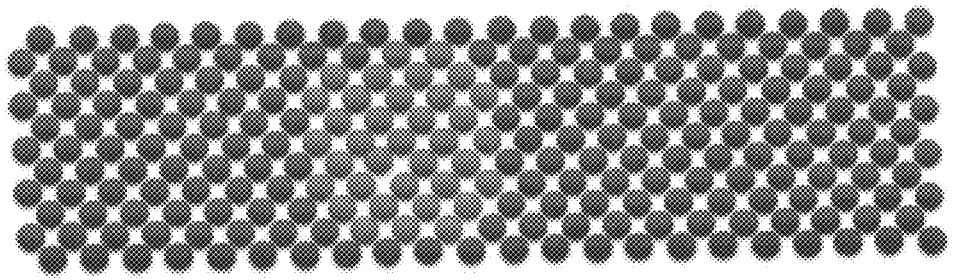
FIG. 4 is a schematic illustration of a pipe scan showing a T-junction.

Finally, grouping many rings 16 of tubes 10 along a pipe could create higher resolution and redundancy to remove false positives. For example, in a single ring, one of the tubes might erroneously 'see' flow and consider it a leak. However, if a series of rings passes over each pipe region, then a true leak will result in a well-ordered detection of the leak in a series of tubes. Thus a single firing can be dismissed as noise. The result of these 'scans' is a sort of 'image' that shows where the pipe is solid and where it is not. In the illustration of 'scanning' the pipe in FIG. 3, lighter dots represent sensing a solid pipe, darker dots represent sensing a leak. This method is similar to how computer scanners create images of documents. A line of sensors moves over the scanned document to create the full 2-D image. In the pipe scanner, the ring of sensors moves down the pipe, sampling for leaks. Dots on the left were sampled first. Then as the ring passes through the pipe, new data is collected. As the ring passes over the leak, it senses the leak in some of the tubes, but not all. After the ring passes the leak, it senses solid pipe again. By arranging the time series of sensing, we can create a 'scan' of the pipe whose visualization will help in diagnosing what type of leak (if it is a leak at all) has occurred.

For example, some observed flow through the small tubes might be representative of normal pipe network operations. If the ring sensor passes by a T-junction, one side of the sensor should experience significant flow. However, the scan of the data should reveal the shape of the flow consistent with an adjoining pipe. In other words, if the scan shows a circle with the same diameter as expected in a T-junction, then the system would know it is an adjoining pipe, not a leak.

The invention disclosed herein can use any sensor technology to detect water movement within the sensing tube 10. In a preferred embodiment, a contact sensor 18 or a flex sensor[5] is used to detect flow. A capacitive sensor may also be used. The contact sensor 18 detects motion when one conductor moves into contact with another (not shown). A flex sensor consists of flexible conductive material separated by a resistive material, whose resistivity changes when deformed (flexed). A capacitive sensor comprises a flexible, non-conductive material with conductive plates embedded within it whose capacitance changes when deformed. Other pressure sensing devices can be used such as piezo-electric pressure sensors. By placing a contact sensor 18 or flex sensor in the sensing channel, the sensor exhibits a change in the presence of pressure gradients in the sensing channel of the tube 10 and thus the presence of a leak in the pipe 12.

Other flow measurement technologies could also be used. Any flow measurement device could be used as part of the invention including but not limited to turbine meters, hot-wire anemometers, variable area flowmeter (rotameter), positive displacement, etc.

Strain gauges also display a change in resistance due to defamation and could be used to detect flow in the sensing channel. Flex sensors may be used but are not preferred because of too large hysteresis effects. The downside of flex sensors is the low precision in correlating deflection quantity with resistance change. For the invention disclosed herein, we are primarily concerned with leak detection and do not need precise measurement of how much deflection occurred, but simply that any deflection has occurred.

In additional embodiments, the invention can be extended to use more sophisticated flow measurement technologies to more precisely measure not only the presence of flow in the sensing channel, but also the quantity of flow in the channel to detect the magnitude of a leak in addition to the existence of the leak.

Figure 5:
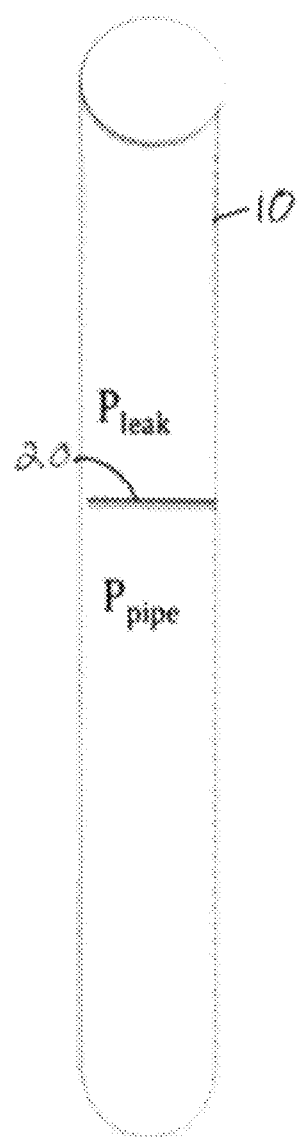
FIG. 5 is a schematic illustration of another embodiment of the invention with no flow through the tube.

Another embodiment of the invention is shown in FIG. 5. The tube 10 includes a membrane 20 that prevents flow in the tube 10. Pressure sensors (not shown) measure pressures on each side of the membrane 20. A pressure difference indicates the presence of a leak. The embodiment of FIG. 5 is a "no flow" configuration.

For completeness, both the "flow" and "no flow" embodiments measure a pressure difference between the two ends of the tube. In the "flow" case, the presence of flow indicates a pressure difference between the two ends of the tube. In other words, the presence of the pressure difference creates the flow that is then measured, in the "no flow" case, the pressure difference between the two ends of the tube is measured in some other way. For example, two pressure sensors could be used and the difference is taken. A preferred embodiment of "no flow" uses a membrane within the tube that is sensitive to the pressure difference on both sides of the membrane.

FIG. 5 shows the tube with the membrane 20 in the middle. Because of the presence of the membrane, when a leak exists at the upper end of the tube, the pressure ($P_{leak}$) is different (lower) than the pressure in the middle of the pipe ($P_{pipe}$). Many methods could be used to detect this pressure difference including, pressure sensors, contact sensors, displacement sensors, capacitance sensors, strain gauges etc.

Because there is a restrictive membrane in the middle of the tube there is little or no flow in the tube.

While this disclosure has focused on detecting water leaks in a pipe, those or ordinary skill in the art will recognize that the present invention is applicable to detecting leaks in pipes carrying any fluids (liquids or gases) such as, for example, oil.

It is further recognized that those of ordinary skill in the art will recognize modifications and variations of the present invention. It is intended that all such modifications and variations be included within the scope of the appended claims.

REFERENCES

1. A. Vickers, "The Future of Water Conservation: Challenges Ahead," Water Resources Update, Universities Council on Water Resources, 114, 49-51, 1999.
2. Environment Canada. 2004. Threats to Water Availability in Canada. National Water Research Institute, Burlington, Ontario. NWRI Scientific Assessment Report Series No. 3 and ACSD Science Assessment Series No. 1. 128 p.
3. L. W. Mays. Water Distribution Systems Handbook, McGraw-Hill, 2000.
4. Anthony Bond, Brian Mergelas, and Cliff Jones. "Pinpointing Leaks in Water Transmission Mains," Pipelines 2004 146, 91 (2004).
5. http://www.imagesco.com/sensors/flex-sensor.html

What is claimed is:

1. Leak detection system comprising:
   structure for supporting at least one tube within a pipe, the at least one tube having one end disposed against a wall of a pipe; and
   a sensor disposed within the at least one tube to detect a pressure gradient or fluid movement within the at least one tube, the pressure gradient or fluid movement indicating a leak in the pipe adjacent to the at least one tube location.

2. The system of claim 1 wherein the structure is a ring sized to fit within the pipe.

3. The system of claim 2 wherein the ring is adapted to support a plurality of tubes.

4. The system of claim 2 wherein the system includes a plurality of rings, each ring supporting a plurality of tubes.

5. The system of claim 1 wherein the sensor is a contact sensor.

6. The system of claim 1 wherein the sensor is a flex sensor.

7. The system of claim 1 wherein the sensor is a turbine meter.

8. The system of claim 1 wherein the sensor is a hot-wire anemometer.

9. The system of claim 1 wherein the sensor is a variable area flow meter.

10. The system of claim 1 wherein the sensor is a positive displacement sensor.

11. The system of claim 1 wherein the sensor is a strain gauge.

12. The system of claim 1 wherein the sensor responds to the quantity of fluid flow within the at least one tube so that magnitude of a leak may be determined.

13. The system of claim 1 wherein the sensor is a pressure sensor or group of pressure sensors.

14. The system of claim 1 wherein the sensor is a pressure difference sensor.

15. Leak detection system comprising:
   structure for supporting at least one tube within a pipe, the at least one tube having one end disposed against a wall of a pipe;
   the at least one tube including a flow restriction that prevents flow through the at least one tube; and
   means for measuring pressure within the at least one tube on both sides of the restriction, a difference in pressure on the two sides indicating a leak in the pipe adjacent to the at least one tube location.

* * * * *

UNITED STATES PATENT AND TRADEMARK OFFICE
CERTIFICATE OF CORRECTION

PATENT NO. : 8,820,143 B2
APPLICATION NO. : 13/082730
DATED : September 2, 2014
INVENTOR(S) : Sanja E. Sarma et al.

It is certified that error appears in the above-identified patent and that said Letters Patent is hereby corrected as shown below:

On the title page, item 73 Assignee, insert --King Fahd University of Petroleum and Minerals, P.O. Box 5041, Dhahran, 31261, Saudi Arabia--

Signed and Sealed this
Twenty-fifth Day of August, 2015

Michelle K. Lee
*Director of the United States Patent and Trademark Office*